US007169855B2

(12) United States Patent
Yamaguchi et al.

(10) Patent No.: US 7,169,855 B2
(45) Date of Patent: Jan. 30, 2007

(54) METHOD FOR PRODUCING TRANSPARENT POLYPROPYLENE SHEET AND TRANSPARENT POLYPROPYLENE SHEET

(75) Inventors: Shigeki Yamaguchi, Sodegaura (JP); Masahiro Kubo, Sodegaura (JP); Katsumi Uchiyama, Sodegaura (JP); Akira Funaki, Sodegaura (JP)

(73) Assignee: Idemitsu Unitech Co., Ltd., Tokyo (JP)

( * ) Notice: Subject to any disclaimer, the term of this patent is extended or adjusted under 35 U.S.C. 154(b) by 0 days.

(21) Appl. No.: 10/496,789

(22) PCT Filed: Dec. 6, 2002

(86) PCT No.: PCT/JP02/12819

§ 371 (c)(1),
(2), (4) Date: Jun. 4, 2004

(87) PCT Pub. No.: WO03/047840

PCT Pub. Date: Jun. 12, 2003

(65) Prior Publication Data

US 2005/0067734 A1 Mar. 31, 2005

(30) Foreign Application Priority Data

Dec. 7, 2001 (JP) ............................ 2001-375060

(51) Int. Cl.
*C08L 23/12* (2006.01)
*C08L 23/14* (2006.01)
*B29C 47/88* (2006.01)
*B29C 47/00* (2006.01)

(52) U.S. Cl. .................. 525/240; 526/348.1; 526/351; 264/176.1; 264/178 R; 264/211.2; 264/211.12; 264/216

(58) Field of Classification Search ............ 526/348.1, 526/351; 525/240; 264/464, 176.1, 211.12, 264/216, 178 R
See application file for complete search history.

(56) References Cited

U.S. PATENT DOCUMENTS 6,545,069 B2 * 4/2003 Itagaki et al. ................ 524/91

FOREIGN PATENT DOCUMENTS

| | | |
|---|---|---|
| EP | 838321 | 4/1998 |
| JP | 62-227722 | 10/1987 |
| JP | 1-306448 | 12/1989 |
| JP | 10-193442 | 7/1998 |
| JP | 2000-246785 | 9/2000 |

* cited by examiner

*Primary Examiner*—Roberto Rabago
(74) *Attorney, Agent, or Firm*—Oblon, Spivak, McClelland, Maier & Neustadt, P.C.

(57) ABSTRACT

An apparatus (1) for producing a transparent polypropylene sheet, which comprises a sheet formation means (11) for melt-kneading a resin composition comprising (A) 60 to 97 mass % of a polypropylene resin having an iostactic pentad proportion of 0.85 to 0.99 and a melt index of 2 to 10 g/10 min and (B) 40 to 3 mass % of a polypropylene resin having a racemic pentad proportion [rrrr/(1-mmmm)] of 0.15 to 0.50 and a melt index of 2 to 10 g/10 min and extruding it into s sheet, a first cooling means (12) for cooling a sheet (20) into a solid, a preheating means (13) for re-heating the cooled sheet (20), a heat treatment means (14) for heat-treating the sheet (20) into a sheet (21) and a second cooling means (15) for cooling the sheet (21) after heat treatment.

6 Claims, 3 Drawing Sheets

1
21
154
153
152
151
147
144
142
143
141
146
145
134
133
132
131
20
124
120
122
125
123
121
111
112
11
12
13
14
15

METHOD FOR PRODUCING TRANSPARENT POLYPROPYLENE SHEET AND TRANSPARENT POLYPROPYLENE SHEET

TECHNICAL FIELD

The present invention relates to a method for producing a transparent polypropylene sheet and a transparent polypropylene sheet.

BACKGROUND ART

The polyvinyl chloride resin has frequently been used in the field of transparent sheets. In association with the trend for higher awareness to the problems of environmental contaminations or the like in recent years, there is a strong need for development of a novel transparent sheet which can be used in place of the polyvinyl chloride resin sheet. As one of the sheets satisfying the requirement, recently a sheet made of polypropylene is often used. In the field of the sheets, there is a need for development of transparent sheets satisfying not only the requirement for transparency, but also the requirements for excellent physical properties, especially for higher impact resistance.

As a method of improving the impact resistance of a polypropylene sheet, there has been known, for instance, the following technologies.

(1) The quenching method using an HPP (homopolypropylene) resin composition with an ethylene-butene-1 copolymer with the low crystallinity blended therein (Japanese Patent Laid-Open Publication No. SHO 62-227722).

(2) The quenching method using an HPP resin composition with an ethylene-butene-1 copolymer with the low density and a nucleating agent blended therein. Especially, the method in which, as the PP, an RPP (random polypropylene) is blended in the HPP (Japanese Patent Laid-Open Publication No. HEI 1-306448).

(3) The quenching method using an HPP with an ethylene-propylene rubber and ethylene- α olefin copolymer blended therein.

Further as a method of improving the rigidity and transparency of a transparent polypropylene sheet, there has been known the following method.

(4) The method in which a transparentizing agent such as a nucleating agent or a petroleum resin is blended in a material for polypropylene.

In the methods (1), (2) and (3) described above, improvement of the impact resistance can be expected. However, the rigidity of the sheet lowers, and also the transparency is sacrificed. Further there occur such new problems as degradation of the transparency due to generation of a gel during recycled use of the sheet, poor appearance, lower adaptability for printing, and whitening during a bending process.

In the method (4) described above, there is the problem of lower impact resistance.

DISCLOSURE OF THE INVENTION

A main object of the present invention is to provide a method for producing a transparent sheet having impact resistance and rigidity without losing the transparency and not whitening during a bending process as a secondary processing and the transparent polypropylene sheet.

The present inventors made hard efforts for development of a transparent polypropylene sheet having the desirable properties as described above, and found that a transparent polypropylene sheet having impact resistance and rigidity without losing the transparency and not whitening during the bending process as a secondary processing can be obtained from a resin composition composed of a polypropylene resin having a specific composition. The present invention was made based on the finding and knowledge as described above.

The method for producing a transparent polypropylene sheet according to the present invention comprises: a forming step of melting and extruding a composition comprising (A) 60 to 97 mass % of a polypropylene resin having an isotactic pentad proportion of 0.85 to 0.99 and a melt index of 2 to 10 g/10 min, and (B) 40 to 3 mass % of a polypropylene resin having a racemic pentad proportion [rrrr/(1-mmmm)] of 0.15 to 0.50 and a melt index of 2 to 10 g/10 min into a sheet-like body, and a cooling step of quenching the extruded sheet-like body, and a heat treatment step of heat-treating the quenched sheet-like body at a temperature not lower than 70° C. and not higher than a melting point of the polypropylene resin.

A content of the polypropylene resin (A) is 60 to 97 mass %, and preferably 70 to 95 mass % against the total weight of the resin composition. A content of the polypropylene resin (B) is 40 to 3 mass %, and preferably 30 to 5 mass % against the total weight of the resin composition.

The melt index can be measured by the method based on the JIS K7210. A melt index of the polypropylene resin (A) is 2 to 10 g/10 min, and preferably 2 to 5 g/10 min. A melt index of the polypropylene resin (B) is 2 to 10 g/10 min, and preferably 2 to 5 g/10 min.

The isotactic pentad proportion is that a pentad unit (five propylene monomers successively bonding to each other in the isotactic state) in a molecule chain of a resin. Namely it indicates a percentage of mmmm (PI value) in a pentad proportion measured for the tacticity of homopolypropylene with $^{13}$C-NMR.

The mmmm (00000) or (11111) indicates an isotactic pentad. The m indicates an isotactic yard, 0 or 1 indicates configuration of each discrete monomer unit along the polymer chain, and 0 indicates one configuration, while 1 indicates configuration contrary to the former configuration.

The method for measuring the isotactic pentad proportion was announced in Macromolecules 6925 (1973).

An isotactic pentad proportion of the polypropylene resin (A) is 0.85 to 0.99, and preferably is 0.87 to 0.96. When the isotactic pentad proportion is less than 0.85, the elasticity modulus or other strengths drop. When the isotactic pentad proportion is higher than 0.99, the internal haze is degraded during the quenching step, and the obtained sheet can hardly be used as a transparent polypropylene sheet.

The rrrr in the racemic pentad proportion [rrrr/(1-mmmm)] indicates a three-dimensional structure having five methyl groups each as side chains positioned in the opposite sides alternately against a main chain based on a carbon-carbon bond comprising five successive polypropylene molecules as a unit or a percentage thereof, while mmmm indicates a three-dimensional structure having methyl groups as side chains positioned in the same side against a main chain based on a carbon-carbon bond comprising five successive polypropylene molecules or a percentage thereof.

A racemic pentad proportion of the polypropylene resin (B) is 0.15 to 0.50, and preferably is 0.20 to 0.45. When this value is less than 0.15, the impact resistance and transparency are insufficient, and also whitening in the bending process becomes remarkable, and when the value is higher than 0.50, the tensile elasticity modulus is insufficient. From a view point of balance as the characteristics of a transparent polypropylene sheet, rrrr/(1-mmmm) should preferably be in the range from 0.20 to 0.40.

More specifically, the rrrr/(1-mmmm) is a value obtained by measuring as described above. Namely, the value for rrrr/(1-mmmm) was obtained by carrying out $^{13}$C-NMR measurement with the JNM-FX-200 (produced by Japan Electron Optics Laboratory co., ltd., $^{13}$C-nuclear resonance frequency of 50.1 MHz) under the following conditions; measurement mode: proton complete decoupling method, pulse width: 6.9 μs (45°), pulse repetition time: 3 s, total times: 10000 times, solvent: 1,2,4-trichlorobenzene/heavy benzene (90/10 volume %), sample density: 250 mg/2.5 ml solvent, and measurement temperature: 130° C. to measure the pentad proportion from a difference in chemical shift associated with tacticity of a methyl group, namely from a ratio between area strengths of peaks for mmmm to mrrm appearing in the 22.5 to 19.5 ppm region.

mmmm: 21.86 ppm
mmmr: 21.62 ppm
mmrr: 21.08 ppm
mmrm+rrmr: 20.89 ppm
rrrr: 20.36 ppm
mrrm: 19.97 ppm Other known olefin-containing copolymer for forming a sheet with 4 mass % or below may be blended in the resin composition having the composition described above, and further an additive, an antistatic agent, a coloring agent or the like each for forming a sheet may be added thereto.

As a forming process, namely as a method for forming and extruding the resin composition described above into a sheet, it is preferable to employ the T-die extrusion method. In the cooling step, a form of the sheet-like resin composition is once fixed. As the cooling method employed in this cooling step, there can be enlisted various cooling methods like those with water, with air, or those using an endless belt or a roller.

A surface of the resin composition once fixed in the sheet form can be finished into a clean state by means of heat treatment. In this heat treatment step, heat treatment can be carried out with an endless belt, a roller or the like. By subjecting the resin composition to heat treatment at a temperature of 70° C. or more and lower than the melting point of the polypropylene resin, the surface finishing can be carried out before the resin composition is completely melted, so that a surface of the resin composition can be flattened and finished into a mirror surface or the like without losing the sheet-like form.

In this step, when the temperature is lower than 70° C., the resin composition is hardly softened, and sometimes the surface can hardly be finished to the desired state. When the temperature is higher than the melting point of the polypropylene resin, the resin composition is completely melted, and in the case the heat treatment may hardly be carried out without losing the sheet-like form.

According to the present invention, by cooling and heat-treating the resin composition having the composition as described above, a transparent polypropylene sheet having impact resistance and rigidity without losing the transparency and not whitening during the bending process as a secondary processing can be obtained.

In the method for producing a transparent polypropylene sheet according to the present invention, the cooling step is preferably carried out by passing the sheet-like body through a slit in which cooling water flows.

With this configuration, by passing the sheet-like body through the slit in which cooling water flows, the sheet-like body is directly cooled by the cooling water while it passes through the slit, and therefore the sheet-like body can be cooled and solidified without generating distortion or the like in a form of the sheet-like body.

In the method for producing a transparent polypropylene sheet according to the present invention, the heat treatment step is preferably carried out by holding top and rear surfaces of the sheet-like boy with a metallic endless belt having a mirror surface and/or a metallic roller and heating the sheet-like body.

With the configuration, the heat treatment step is carried out by holding top and rear surfaces of the sheet-like boy with a metallic endless belt having a mirror surface and/or a metallic roller and heating the sheet-like body, and the surface contacting the sheet-like body is a mirror surface, so that a surface of the sheet-like body can be processed into a mirror-like state.

The transparent polypropylene sheet according to the present invention comprises (A) 60 to 97 mass % of polypropylene resin having an isotactic pentad proportion of 0.85 to 0.99 and a melt index of 2 to 10 g/10 min, and (B) 40 to 3 mass % of polypropylene resin having a racemic pentad proportion [rrrr/(1-mmmm)] of 0.15 to 0.50 and a melt index of 2 to 10 g/10 min, and is characterized in that the total haze not more than the reference value Hr calculated through the expression of $Hr=330t^2-150t+20$ when the tensile elasticity modulus in the extrusion forming direction (MD direction) is not less than 1700 MPa and the sheet thickness is t [mm].

Herein the thickness of the transparent polypropylene sheet is 150 to 1000 μm, and preferably is 200 to 600 μm.

The tensile elasticity modulus can be measured by the method based on JIS K7113 or the like. When the tensile elasticity modulus in the extrusion forming direction (MD direction) is lower than 1700 MPa, the strength may be insufficient in practical use.

The total haze H can be measured by the method based on JIS K7105 or the like. When the total haze H is not higher than Hr ($=330t^2-150t+20$), a transparent polypropylene sheet with excellent transparency can be obtained.

With the present invention as described above, as the polypropylene resin has the composition as described above, it is possible to obtain a transparent polypropylene sheet having impact resistance and rigidity and not whitening during the bending process as a secondary processing without losing the transparency.

In the transparent polypropylene sheet according to the present invention, the impact resistance at 5° C. should preferably be 2000 J/m or more, and more preferably is in the range from 2000 to 3000 J/m.

When the impact resistance is lower than 2000 J/m, the impact resistance often required to a packaging material or a clear file in practical use thereof may not be satisfied.

In the transparent polypropylene sheet according to the present invention, it is preferable that a nucleating agent is not included in the polypropylene resin (A), nor in the polypropylene resin (B).

With the configuration, as a nucleating agent provides the nucleation effect for raising the crystallizing speed, when a resin is reheated for forming, crystallization occurs before a specified form is obtained, and the resin is fixed in an undesired form. In contrast, as the polypropylene resins (A) and (B) do not contain a nucleating agent, the adaptability to be processed to a desired form is never degraded.

BEST MODE FOR CARRYING OUT THE INVENTION

Embodiments of the present invention are described below with reference to the related drawings.

First Embodiment

Figure 1:
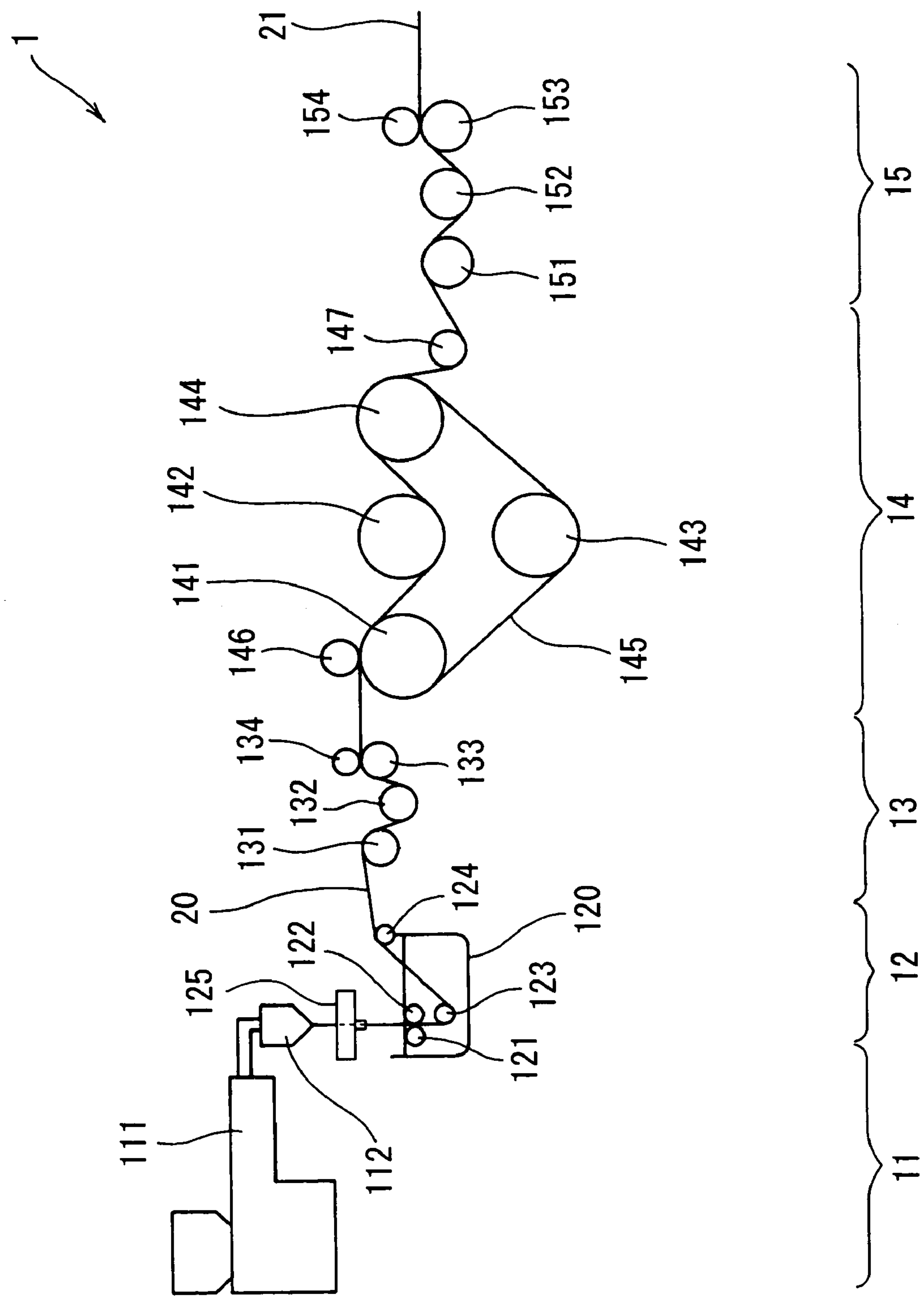
FIG. 1 is a general view showing a production device according to a first embodiment of the present invention.

FIG. 1 is a production device for producing a transparent polypropylene sheet according to a first embodiment of the present invention.

A production device 1 comprises a sheet formation unit 11 for melt-kneading and extruding a raw material into a sheet, a first cooling unit 12 for cooling a sheet 20 into a solid, a pre-heating unit 13 for re-heating the cooled sheet 20, a heat treatment unit 14 for heat-treating the sheet 20 into a sheet 21, and a second cooling unit 15 for cooling the sheet 21 having been subjected to the heat treatment.

The sheet formation unit 11 has, for instance, the conventional type of extrusion machine 111 such as a single-shaft extrusion machine or a multi-shaft extrusion machine, and a T die 112 for sheet formation is provided at a tip of the extrusion machine 111.

With these components, the melt-kneaded sheet composition is extruded from the T die 112 into a sheet to form a sheet.

This sheet composition is a resin composition comprising (A) 60 to 97 mass % of polypropylene resin having an isotactic pentad proportion of 0.85 to 0.99 and a melt index of 2 to 10 g/10 min, and (B) 40 to 3 mass % of polypropylene resin having a racemic pentad proportion [mm/(1-rrrr)] of 0.15 to 0.50 and a melt index of 2 to 10 g/10 min.

Raw materials to be processed into a sheet composition may have any form including particle, granule, pellet or the like, and are mixed with each other so that the sheet composition has the composition as described above.

It is to be noted that a known and other olefin-containing copolymer for sheet formation may be added by 4 mass % or below in the resin composition, and further any known additive, antistatic agent, coloring agent or the like for sheet formation may be blended therein, but a nucleating agent is not included therein.

The first cooling unit 12 comprises a large water bath 120, a first roller 121 and a second roller 122 provided at positions opposite to the large water bath 120 for holding the sheet 20 therebetween, a third roller 123 provided at a position closer to a bottom of the large water bath 120 than the rollers 121, 122, a fourth roller 124 provided at a position near a periphery of large water bath 120 to the side of the pre-heating unit 13, and a small water bath 125 provided above the large water bath 120.

Figure 2:
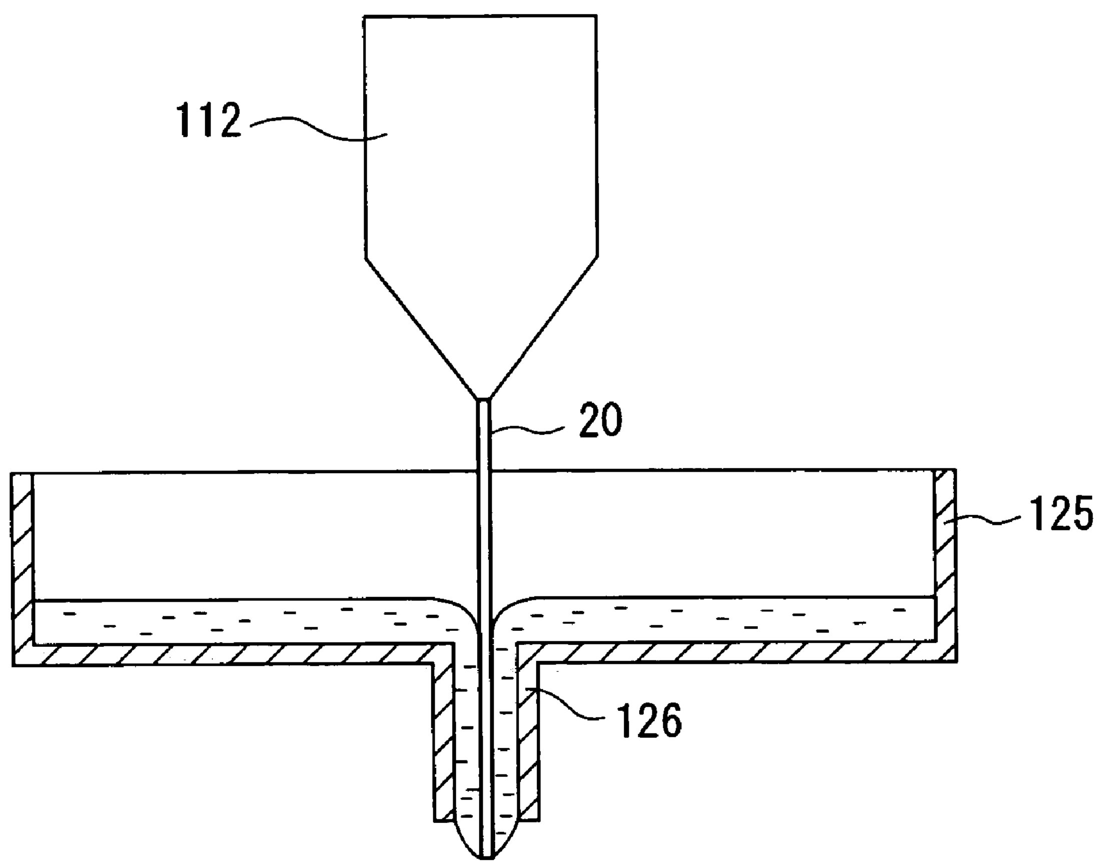
FIG. 2 is a partially enlarged view showing a small water bath in the first embodiment of the present invention.

At a substantially central portion of the bottom surface of the small water bath 125, as shown in FIG. 2, a slit 126 having the size similar to that of an opening of the T die 112 is formed at a position corresponding to the opening. This slit 126 is formed in the vertical direction to the bottom surface of the small water bath 125, but the slit 126 may have a form with the diameter becoming smaller toward a lower section of the slit 126.

A space of the slit 126 is in the range from 1 to 20 mm at the entrance side of the slit 126, and preferably is in the range from 3 to 10 mm. On the other hand, the space at the exit size of the slit 126 is at least larger than the thickness of the sheet 20 and 0.5 mm or more, and preferably is 1.0 mm or more. It is to be noted that typically the slit 126 has a wall-like form with the thickness in the range from 1 to 10 mm and the length in the range about from 30 to 70 mm. The distance between the slit 126 and the T die 112 is typically about 30 to 250 mm.

Although not shown in the figure, cooling water or the like for cooling the sheet 20 can continuously be supplied with a pump or the like from the outside into the small water bath 125.

With the configuration, the sheet 20 formed with the formation unit 11 flows downward through the slit 126 together with the cooling water continuously supplied into the small water bath 125, and then is introduced into the large water bath 120 in association with rotation of the rollers 121, 122, and 123 to be cooled into a solid therein.

The pre-heating unit 13 comprises first and third pre-heating rollers 131, 133 provided at the substantially same height in parallel to each other, a second pre-heating roller 132 provided at a position a little displaced downward being held between the pre-heating rollers 131, 133, and an auxiliary press roller 134 with the peripheral surface pressed to and turned on a peripheral surface of the third pre-heating roller 133 to hold the sheet 20 from a top and a bottom thereof.

An electric heater or the like is incorporated in each of the pre-heating rollers 131, 132, and 133, and a peripheral surface of each of the rollers is heated to a prespecified temperature.

A draining facility may be provided between the first pre-heating roller 131 and the fourth roller 124, if necessary.

With the configuration, the cooled and solidified sheet 20 is pressed to peripheral surfaces of the pre-heating rollers 131, 132, and 133 to be heated previously.

The heat treatment unit 14 comprises first, second, and third heating rollers 141, 142, 143, a cooling roller 144, an endless belt 145, an auxiliary press roller 146, and a separating roller 147.

The first and second heating rollers 141, 142 and the cooling roller 144 are provided at the substantially same height in parallel to each other, and the third heating roller 143 is provided just below and in parallel to the heating roller 142. As an electric heater or the like is incorporated in each of the first to third heating rollers 141, 142, 143, peripheral surfaces of the first to third heating rollers 141, 142, 143 are heated to temperatures not lower than 70° C. and not higher than the melting points (for instance, about 175° C.) of the polypropylene resins (A) and (B) respectively, while a peripheral surface of the cooling roller 144 has a structure in which cooling water or the like circulates therein and is cooled to a desired temperature.

The endless belt 145 is wound around the first and third heating rollers 141, 143 and the cooling roller 144 so that the components are within the loop. With the configuration, the endless belt 145 is spanned and pressed from the outer side to the inner side by the second heating roller 142.

The endless belt 145 has an outer surface finished into a mirror surface, and the thickness is within the range from 0.1 to 3.0 mm, and preferably is within the range from 0.4 to 1.5 mm.

A material for the endless belt 145 is preferably SUS 301, SUS 304, SUS 316, or other material equivalent thereto, and also a metal such as carbon steel or titanium may be used.

The auxiliary press roller 146 is pressed from the upper side to the first heating roller 141 and is turned on a surface of the first heating roller 141.

The separating roller 147 is used to separate the sheet 20 from the endless belt 145, and have holes provided with a prespecified space near the cooling roller 144.

With the configuration, the pre-heated sheet 20 is pressed to the endless belt 145 in association with rotation of the heating rollers 141, 142, 143 and the cooling roller 144 to a desired temperature with the surface processed to the desired state.

The second cooling unit 15 comprises first, second, and third cooling rollers 151, 152, 153 provided at the substantially same height in parallel to each other and cooled respectively and an auxiliary press roller 154 pressed to and turned on a surface of the third cooling roller 153 for holding the sheet 20 therebetween.

However, it is preferable that temperatures of peripheral surfaces of the cooling rollers 151, 152, 153 are lower than that of the cooling roller 144.

With the configuration, the sheet 20 with the surface processed to a desired state is pressed to peripheral surfaces of the cooling rollers 151, 152, 153, and is moved to be cooled thereby.

In this embodiment having the configuration as described above, at first, the sheet 20 is formed by the sheet formation unit 11 by extruding a sheet composition from the T die 112 into a sheet 20 (formation step).

Then the sheet 20 is guided to the first cooling unit 12, and is cooled into a solid therein. Namely, the sheet 20 flows downward through the slit 126 together with the cooling water continuously supplied to the small water bath 125, and then is introduced into the large water bath 120, in which the sheet 20 is held between the first roller 121 and the second roller 122 and is fed to the third roller 123, and then is guided by the fourth roller 123 to outside of the large water bath 120. The sheet 20 is cooled into a solid while moving inside the large water bath 120 (first cooling step).

Then the cooled and solidified sheet 20 is introduced into the pre-heating unit 13 and pre-heated to a prespecified temperature.

Namely, the sheet 20 is guided from the fourth roller 124 to an upper section of the peripheral surface of the first pre-heating roller 131, and then is fed to an upper section of a peripheral surface of the third pre-heating roller 133 via a lower section of the peripheral surface of the second pre-heating roller 132, and is fed being held by the auxiliary press roller 134 to the outside.

The sheet 20 is moved up and down and is fully pressed to peripheral surfaces of the pre-heating rollers 131, 132, 133, and is efficiently and homogenously heated to a prespecified temperature (pre-heating step).

Then the sheet 20 pre-heated as described above is guided to the heat treatment unit 14, where the surface is processed into a smooth state.

Namely, the sheet 20 is guided from the pre-heating roller 133 to an upper section of a peripheral surface of the first heating roller 141 and held by the auxiliary press roller 146 and the endless belt 145, and is tightly pressed to the endless belt 145.

The sheet 20 is guided together with the endless belt 145 to a lower section of the peripheral surface of the second heating roller 142, and is again pressed by the second heating roller 142 to the endless belt 145.

Further the sheet 20 is sent together with the endless belt 145 to an upper section of the cooling roller 144, cooled by the cooling roller 144, guided by the separating roller 147, and is separated from the endless belt 145.

With the configuration, the sheet 20 is fully pressed to the endless belt 145 having a mirror surface heated to a temperature not less than 70° C. and not higher than a melting point of the resin composition, so that the sheet 21 with the pressed surface having been formed into a smooth state can be obtained (heat treatment step).

Then the sheet having a desired surface form is guided to the second cooling unit 15 and is cooled to a prespecified temperature.

Namely the sheet 21 is guided from the separating roller 147 to an upper section of a peripheral surface of the first cooling roller 151 and sent to the third cooling roller 153 via a lower section of the peripheral surface of the second cooling roller 152, and is pressed to the auxiliary press roller 154.

As described above, the sheet 21 is sufficiently pressed to and cooled by the cooling rollers 151, 152, 153 (second cooling step).

With the operations described above, the transparent polypropylene sheet 21 according to the present invention can be obtained.

With the embodiment as described above, there are provided the following advantages.

(1) The transparent polypropylene sheet 21 having impact resistance and rigidity and not whitening during a bending process as a secondary processing can be obtained without losing the transparency.

(2) As a surface can be formed into a desired state by heat-treating the sheet 20 comprising a resin composition at a temperature not lower than 70° C. and not higher than a melting point of the resin composition, before the resin composition is completely melted, whereby a surface of the resin composition can be finished to a flat surface or a mirror surface without losing the sheet form.

(3) In the first cooling step, the sheet 20 as a sheet-like body is passed together with cooling water through the slit 126 in which the cooling water flows to cool the sheet 20, so that the cooling water directly cools the sheet 20 while the sheet 20 is passing through the slit 126, and because of this configuration, the sheet 20 can be cooled to a solid without generating distortion or the like in a form of the sheet 20.

(4) In the heat treatment step, the endless belt 145 having a mirror surface holds the top and bottom surfaces of and heating the sheet 20 which is a sheet-like body, and as the surface contacting the sheet 20 is a mirror surface, so that a surface of the transparent polypropylene sheet 21 can be processed into a mirror surface.

(5) As a nucleating agent has the nucleating effect for raising the crystallizing speed, when reheated and processed for formation into a desired form, a resin composition is crystallized and formed into a solid before the composition is processed into the desired form. In contrast, as the polypropylene resins (A) and (B) do not contain a nucleating agent, the adaptability to being formed into a desired form is not degraded.

Second Embodiment

A second embodiment of the present invention is described below. It is to be noted that the same reference numerals are assigned to the same parts and components already described and detailed description thereof is omitted herefrom.

Figure 3:
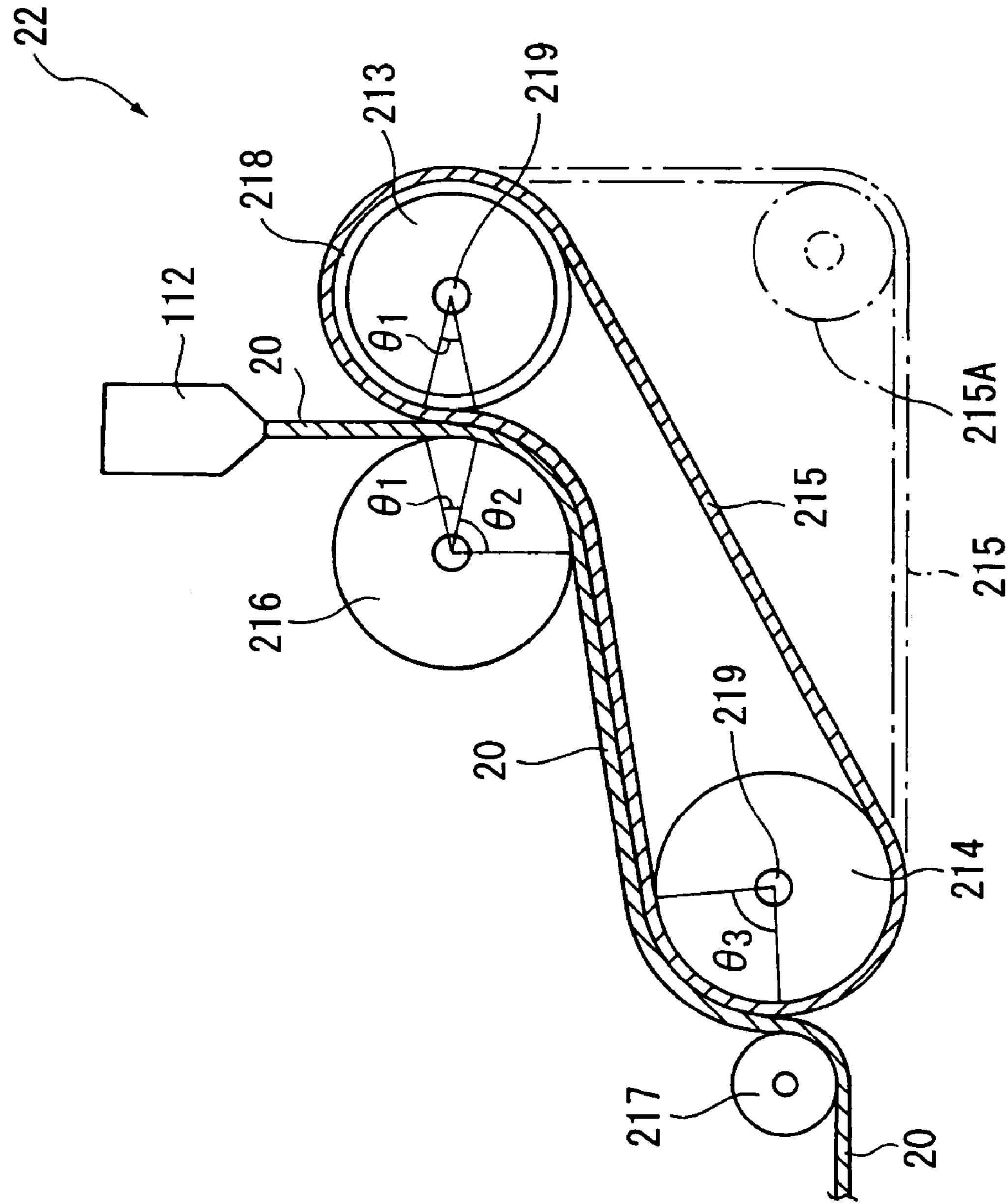
FIG. 3 is a general view showing a production device according to a second embodiment of the present invention.

A production device 2 for producing a transparent polypropylene sheet according to the second embodiment of the present invention is described below with reference to FIG. 3. In the production device 1 according to the first embodiment, the first cooling unit 12 for cooling the sheet 20 into a solid comprises the large water bath 120 and the small water bath 125 having the slit 126.

In contrast, in the production device 2 according to the second embodiment, the first cooling unit 22 is different from the production device 1 in the configuration in which it comprises a metallic endless belt 215 wound between a first cooling roller 213 and a second cooling roller 214, a third cooling roller 216 contacting the first cooling roller 213 via a polypropylene resin sheet 11 and the metallic endless belt 215, and a fourth roller 217 provided near the second cooling roller 14.

As indicated by a chain line in FIG. 1, the configuration is allowable in which another cooling roller 215A is provided in front of the first roller 213 and contacted to the endless belt 215 from the inner side to further cool the endless belt 215.

A surface of the first cooling roller 213 is coated with an elastic material 218 such as fluorine rubber. This elastic material 218 has the hardness of 60 degrees or below (based on JIS K6301, form A) and the thickness of 3 mm or more.

The metallic endless belt 215 is made from stainless steel or the like, and has a mirror surface with the surface roughness of 0.5 S or below.

At least either one of the first and second cooling rollers 213, 214 has a rotating shaft 219 jointed to a rotating/driving means (not shown).

The third cooling roller 216 also has a mirror surface with the surface roughness of 0.5 S or below. This cooling roller 216 contacts the first cooling roller 213 via the sheet 20 and the metallic endless belt 215, and is provided so that it embraces the sheet 20 pressed by the endless belt 215 to the cooling roller 216. Namely, the metallic endless belt 215 and the sheet 20 contacting this endless belt 215 move in the snaking state to wind around a portion of a peripheral surface of the third cooling roller 216.

The fourth roller 217 guides the sheet 20 so that the sheet 20 is pressed via the endless belt 215 to the second cooling roller 214.

A temperature adjuster (not shown) based on the water cooling system or the like capable of adjusting the surface temperature is provided in each of the cooling rollers 213, 214, and 216.

Like in the first embodiment, after a formation step is carried out with the sheet formation unit 11, the sheet 20 is introduced into the first cooling unit 22 and is cooled into a solid therein.

More specifically, at first a temperature of each of the cooling rollers 213, 214, and 216 is controlled so that surface temperatures of the endless belt 215 and the third cooling roller 216 each directly contacting the sheet 20 are kept at a temperature not higher than 50° C. and not lower than the dew point.

Then the sheet 20 extruded from the T die 112 of the extruding machine is guided to between the first and third cooling rollers 213, 216 so that the sheet 20 contacts the endless belt 215 contacting the first cooling roller 213 and the third cooling roller 216 at the substantially same time, where the sheet 20 is pressed by the first and third cooling rollers 213, 216 to cool the sheet 20 to 50° C. or below.

In this step, the elastic material 218 is compressed and elastically deforms due to the pressing force working between the first and third cooling rollers 213, 216, and in a portion within an angle $\theta_1$ from an intermediate point between the two rollers 213 and 216 where the elastic body 218 elastically deforms, a portion of a surface of the sheet 20 is pressed by the two rollers 213, 216. The surface pressure in this step is in the range from 0.1 MPa to 20.0 MPa.

Then the sheet 20 is pressed by the endless belt 215 having a mirror surface to the third cooling roller 216 and is cooled to a temperature of 50° C. or below. The sheet 20 pressed by the endless belt 215 to the cooling roller 216 is embraced by the cooling roller 216 within an angle $\theta_2$ from a center of the cooling roller 216, and a portion of a surface of the sheet 20 is pressed by the endless belt 215 and the third cooling roller 216 within this embracing angle $\theta_2$. The surface pressure in this step is in the range from 0.01 MPa to 0.5 MPa.

Then the second cooling roller 214 is moved in association with rotation of the endless belt 215 in the state where the sheet 20 has been overlaid on the endless belt 215, and the sheet 20 is pressed via the endless belt 215 to the second cooling roller 214 to cool the sheet 20 to 50° C. or below. A portion of a surface of the sheet 20 guided by the fourth roller 217 and pressed to the cooling roller 214 is pressed to the endless belt 215 within a angle $\theta_3$ portion. The surface pressure in this step is in the range from 0.01 MPa to 0.5 MPa (first cooling step). Then the sheet 20 is subjected, like in the first embodiment, to the pre-heating step by the pre-heating unit 13, a heat treatment step by the heat treatment unit 14, and the second cooling step by the second cooling unit 15 to obtain a transparent polypropylene sheet.

With the embodiment as described above, in addition to the advantages provided in the first embodiment (excluding (3)), there are provided the following advantages.

(6) Because of the surface-to-surface contact of the sheet 20 with and cooling thereof by the first and third rollers 213, 216 in the angle $\theta_1$ portion in which the elastic body 218 elastically deforms, the surface-to-surface contact of the sheet 20 with and cooling thereof by the endless belt 215 and the third cooling roller 216 in the angle $\theta_2$ portion, and the surface-to-surface contact of the sheet 20 with and cooling thereof by the endless belt 215 and the second cooling roller 214 in the angle $\theta_3$ portion, the highly-transparent sheet 20 can be produced at a high speed.

It is to be noted that the present invention is not limited to the embodiments described above, and modifications and improvements within a range in which the object of the present invention can be achieved are encompassed within a scope of the present invention. For instance, the heat treatment step is carried out by using the endless belt 145 in the embodiments described above, but the present invention is not limited to this configuration, and the heat treatment step may be carried out with a metallic roller or the like.

Further the specific structures, forms, and others employed for carrying out the present invention may be different from those described above within a range in which the objects of the present invention can be achieved.

The present invention is described below in more details with reference to examples and comparative examples. It is to be noted that the present invention is not limited to contents of the examples described below.

SPECIFIC EXAMPLES

With the production device 1 according to the first embodiment (Refer to FIG. 1), the transparent polypropylene sheet 21 was produced under the conditions described below and shown in Table 1.

| | Polypropylene resin (A) | |
|---|---|---|
| HPP-1 (homopolypropylene) | Isotactic molecular pentad proportion: | 0.90 |
| | MI | 3.0 g/10 min |
| HPP-2 (homopolypropylene) | Isotactic molecular pentad proportion: | 0.92 |
| | MI | 2.0 g/10 min |
| | Polypropylene resin (B) | |
| TPO (Thermo Plastic Olefin elastomer) | Racemic pentad proportion [rrrr/(1-mmmm)] | 0.24 |
| | Isotactic pentad proportion | 0.76 |
| | MI | 2.8 g/10 min |
| | Melting point (measured by DSC method) | 158.7° C. |
| | Melting enthalpy [ΔH] | 81 J/g |

| | |
|---|---|
| mmmm: | 21.86 ppm |
| mmmr: | 21.62 ppm |
| rmmr: | 21.08 ppm |
| mmrm + rrmr: | 20.89 ppm |
| rrrr: | 20.36 ppm |
| mrrm: | 19.97 ppm |

| | Random polypropylene | |
|---|---|---|
| RPP | Ethylene content | 3 wt % |
| | MI | 5.0 g/10 min |
| | Linear low density polyethylene | |
| LLDPE | Density | 907 kg/m$^3$ |
| | MI | 3.0 g/10 min |

| | |
|---|---|
| Temperature of the resin composition: | 240° C. |
| Temperature near the opening of the T die 112: | 280° C. |
| Temperature of the pre-heating rollers 131, 132, 133 in the pre-heating step: | 110° C. |
| Temperature of the heating rollers 141, 142, 143 in the surface formation step: | 145° C. |
| Rotation speed of the endless belt 145: | 15 to 25 m/min |

TABLE 1

| | | Example 1 | Example 2 | Example 3 | Com. Example 1 | Com. Example 2 |
|---|---|---|---|---|---|---|
| Raw material config. | Raw material name (Ratio: wt %) | HPP-1(85) TPO(10) HPP-2(5) | HPP-1(87) TPO(8) HPP-2(5) | HPP-1(90) TPO(5) HPP-2(5) | HPP-1(85) RPP(10) HPP-2(5) | HPP-1(85) LLDPE(10) HPP-2(5) |
| Thickness (μm) | | 300 | 300 | 300 | 300 | 300 |
| Tensile charac. | MD elasticity modulus (MPa) | 2100 | 2100 | 2100 | 2100 | 2000 |
| | TD elasticity modulus (MPa) | 2100 | 2100 | 2200 | 2200 | 1900 |
| Optical charac. | Total haze(%) | 3.5 | 3.6 | 3.8 | 4.0 | 3.8 |
| | Inter.haze(%) | 1.5 | 1.6 | 1.8 | 2.2 | 2.5 |
| | Glossiness (%) | 140 | 138 | 138 | 136 | 138 |
| Impact resistance (J/m) | 23° C. | NB | NB | NB | 4840 | NB |
| | 5° C. | 2200 | 2100 | 2100 | 2000 | 2500 |
| | −5° C. | 1700 | 1670 | 1650 | 1560 | 1950 |
| Whitening in bending process | | ◎ | ◎ | ◎ | ○ | Δ |

The isotactic pentad proportion and racemic pentad proportion [rrrr/(1-mmmm)] are values obtained by measurement under the conditions described below. Namely, with the use of JNM-FX-200 (produced by Japan Electron Optics Laboratory co., ltd., $^{13}$C-nuclear resonance frequency of 50.1 MHz), $^{13}$C-NMR measurement is carried out under the following conditions; measurement mode: proton complete decoupling method, pulse width: 6.9 μs (45°), pulse repetition time: 3 s, total times: 10000 times, solvent: 1,2,4-trichlorobenzene/heavy benzene (90/10 volume %), sample density: 250 mg/2.5 ml solvent, and measurement temperature: 130° C. to measure the pentad proportion from a difference in chemical shift associated with tacticity of a methyl group, namely from a ratio between area strengths of peaks for mmmm to mrrm appearing in the 22.5 to 19.5 ppm region for obtaining the value of rrrr/(1-mmmm).

The melt index values given in the specification and claims were measured by the method as defined in JIS K7210. The specific procedures and conditions utilized during the melt index value measurements were as follows. An extrusion plastometer is laid on a horizontal platform and molten polypropylene at 230° C. is introduced into a vertical metal cylinder inside the plastometer in which temperature is maintained at 230° C.±1.5° C. along the entire length. The inner diameter of the metal cylinder is 9.550 mm±0.025 mm and is provided with a die having inner diameter of 2.095 mm ±0.005mm. The molten polypropylene is extruded from the die by a piston inserted into the cylinder with a load of 2.16kg. After the piston is descended and an upper marker provided on the piston is reached to the upper end of the cylinder, a timer is started and the extruded polypropylene material is cut for every 60 or 30 seconds according to the (predicted) melt flow rate of the polypropylene material* until a lower marker provided on the piston reaches the upper end of the cylinder. The weight of the cut samples (at least three) is measured to the nearest mg and the average is calculated to measure the melt flow rate which is reported in g/l 0 mm.

*60 seconds is used for material of: 1<MFR≦3.5 30 seconds is used for material of: 3.5<MFR≦10

The tensile elasticity modulus values given in the specification and claims were measured by the method as defined in JIS K7113. The specific procedures and conditions utilized during the tensile elasticity modulus value measurements were as follows. In a room environment at 20±2° C. and relative humidity of 50±5%, both ends of a flat sample piece (the average of at least 5 is used to calculate the tensile elasticity modulus) of polypropylene having fat portions on the both ends and a marked parallel thin portion (see JIS K7113 for the specific configuration of the sample) in between is held by two grippers. The grippers are separated by 50 mm/min (±10%), where (1) the tensile load applied to the sample and (2) the width and the thickness of the parallel portion at (a) the center of the markers and (b) 5mm inner portion of one of the markers, are measured in conjunction with elapsed time, thereby obtaining a tensile-stress/strain curve, where the slope of the initial straight line portion (where the tensile stress substantially linearly increases in accordance with the load applied) is used to determine the tensile elasticity.

Characteristics of the produced transparent polypropylene sheets 21 were evaluated. A result of the evaluation is shown in Table 1. The tensile elasticity modulus was measured by the method based on JIS K7113. MD used in relation to the tensile characteristics indicates a direction in which extrusion for formation is performed, and TD indicates a direction perpendicular to the MD direction.

The total haze and internal haze are values measured based on JIS K7105 with the haze measurement instrument (produced by Nippon Denshoku Industries Co., Ltd.). The glossiness are values measured based on JIS K7105 and with the automatic color-difference meter for color measurement (produced by Suga Test Instruments CO., Ltd.).

The impact resistance was measured using the film impact tester (produced by Toyo Seiki Seisaku-sho, Ltd.) under the conditions of testing load of 30 kg and 1-inchi head and at the temperatures of 23° C., 5° C., and −5° C. NB in the table indicates that destruction of material did not occur when measured at the measurement limit value of 10000 J/m.

Also whitening of produced transparent polypropylene sheets 21 in the bending process was evaluated.

◎: Whitening did not occur.

○: Whitening occurred, and could visually be observed, but only slightly.

Δ: Whitening occurred, and could visually be observed.

As understood from Table 1, as compared to Comparative Examples 1 and 2 in which the polypropylene resin (B) is not contained, and RPP or LLDPE is contained, in Examples 1 to 3 in which the polypropylene resin (B) is contained, the transparent polypropylene sheet having impact resistance and rigidity and not whitening during a bending process as a secondary processing can be produced without losing the transparency.

INDUSTRIAL AVAILABILITY

The transparent polypropylene sheet according to the present invention can be used as a transparent sheet for packaging or the like, and is more excellent in satisfying the requirements for prevention of environmental contaminations as compared to the conventional polyvinyl chloride resin, and the sheet is also excellent in other physical properties, especially in impact resistance.

The invention claimed is:

1. A method for producing a transparent polypropylene sheet comprising:

a formation step of melting and extruding a resin composition comprising (A) 60 to 97 mass % of a polypropylene resin having an isotactic pentad proportion of 0.85 to 0.99 and a melt index of 2 to 10 g/10 min, and (B) 40 to 3 mass % of a polypropylene resin having a racemic pentad proportion [rrrr/(1-mmmm)] of 0.15 to 0.50 and a melt index of 2 to 10 g/10 min into a sheet-like body;

a cooling step of quenching the extruded sheet-like body; and a heat treatment step of heat-treating the quenched sheet-like body at a temperature not lower than 70° C. and not higher than a melting point of the polypropylene resin.

2. The method for producing a transparent polypropylene sheet according to claim 1, wherein said cooling step is carried out by passing said sheet-like body through a slit in which cooling water flows downward to quench said sheet-like body.

3. The method for producing a transparent polypropylene sheet according to claim 1 or claim 2, wherein said heat treatment step is carried out by holding said sheet-like body from the top and bottom side by a metallic endless belt having a mirror surface and/or a metallic roller to heat the sheet-like body.

4. A transparent polypropylene sheet comprising (A) 60 to 97 mass % of a polypropylene resin having an isotactic pentad proportion of 0.85 to 0.99 and a melt index of 2 to 10 g/10 min, mixed with (B) 40 to 3 mass % of a polypropylene resin having a racemic pentad proportion [rrrr/(1-mmmm)] of 0.15 to 0.50 and a melt index of 2 to 10 g/10 min, wherein a tensile elasticity modulus in the extruding direction (MD direction) is 1700 MPa or more; and wherein a total haze H assuming the sheet thickness of t [mm] is not more than a value expressed by the following expression:

$$Hr=330t^2-150t+20.$$

5. The transparent polypropylene sheet according to claim 4, wherein the impact resistance at 5° C. is 2000 J/m or more.

6. The transparent polypropylene sheet according to claim 4 or claim 5, wherein said polypropylene resins (A) and (B) do not contain a nucleating agent.

* * * * *